US011146779B2

(12) United States Patent
Tomizawa et al.

(10) Patent No.: US 11,146,779 B2
(45) Date of Patent: Oct. 12, 2021

(54) DISPLAY DEVICE WITH PIXEL SHIFT ON SCREEN

(71) Applicant: Japan Display Inc., Tokyo (JP)

(72) Inventors: Kazunari Tomizawa, Tokyo (JP); Yoshihiko Kuroki, Tokyo (JP)

(73) Assignee: Japan Display Inc., Tokyo (JP)

( * ) Notice: Subject to any disclaimer, the term of this patent is extended or adjusted under 35 U.S.C. 154(b) by 87 days.

(21) Appl. No.: 15/872,488

(22) Filed: Jan. 16, 2018

(65) Prior Publication Data
US 2018/0213211 A1    Jul. 26, 2018

(30) Foreign Application Priority Data

Jan. 23, 2017   (JP) .............................. JP2017-009471

(51) Int. Cl.
| *H04N 13/305* | (2018.01) |
| *H04N 13/31* | (2018.01) |
| *H04N 13/324* | (2018.01) |
| *H04N 13/346* | (2018.01) |
| *G02B 5/04* | (2006.01) |
| *G02B 30/27* | (2020.01) |

(52) U.S. Cl.
CPC .......... *H04N 13/305* (2018.05); *G02B 5/045* (2013.01); *G02B 30/27* (2020.01); *H04N 13/31* (2018.05); *H04N 13/324* (2018.05); *H04N 13/346* (2018.05)

(58) Field of Classification Search
CPC .. G02B 27/2214; G02B 5/045; H04N 13/305; H04N 13/31; H04N 13/324; H04N 13/346
See application file for complete search history.

(56) References Cited

U.S. PATENT DOCUMENTS

| 5,175,616 | A | * | 12/1992 | Milgram ................ G03B 35/08 |
| | | | | 348/47 |
| 2003/0103136 | A1 | * | 6/2003 | Stanton ................ H04N 13/261 |
| | | | | 348/49 |
| 2004/0183975 | A1 | * | 9/2004 | Yamaguchi ......... G02F 1/13318 |
| | | | | 349/137 |
| 2006/0279633 | A1 | * | 12/2006 | Oka ........................ G06T 7/001 |
| | | | | 348/187 |
| 2009/0309108 | A1 | * | 12/2009 | Chang ................. H01L 27/3211 |
| | | | | 257/89 |
| 2012/0019515 | A1 | * | 1/2012 | Chao ..................... H04N 13/341 |
| | | | | 345/419 |
| 2012/0050502 | A1 | * | 3/2012 | Chi ....................... H04N 13/398 |
| | | | | 348/51 |
| 2012/0274542 | A1 | * | 11/2012 | Yamazaki .............. H04N 13/31 |
| | | | | 345/32 |
| 2012/0293503 | A1 | * | 11/2012 | Miyazawa ............. G02B 30/27 |
| | | | | 345/419 |

(Continued)

FOREIGN PATENT DOCUMENTS

| JP | 2014-515569 A | 6/2014 |
| WO | 2012/156489 A1 | 11/2012 |

*Primary Examiner* — Jessica M Prince
(74) *Attorney, Agent, or Firm* — K&L Gates LLP

(57) ABSTRACT

According to one embodiment, a display device includes a display unit configured to display an image for right eye and an image for left eye. Resolution of the display unit is P pixels or more per inch. Pixel shift of the image for right eye and the image for left eye displayed on the display unit is 0.021×P pixels or less and one pixel or more.

11 Claims, 10 Drawing Sheets

(56) References Cited

U.S. PATENT DOCUMENTS

| | | | |
|---|---|---|---|
| 2013/0057521 A1* | 3/2013 | Kim | H01L 27/3216 |
| | | | 345/204 |
| 2013/0235005 A1* | 9/2013 | Ohyama | H04N 13/376 |
| | | | 345/204 |
| 2014/0085435 A1 | 3/2014 | Doyen et al. | |
| 2014/0375778 A1* | 12/2014 | Miao | H04N 13/327 |
| | | | 348/51 |
| 2015/0145977 A1* | 5/2015 | Hoffman | H04N 13/376 |
| | | | 348/59 |
| 2017/0092168 A1* | 3/2017 | Peana | G09G 3/007 |
| 2017/0140571 A1* | 5/2017 | Peterson | H04N 13/373 |

* cited by examiner

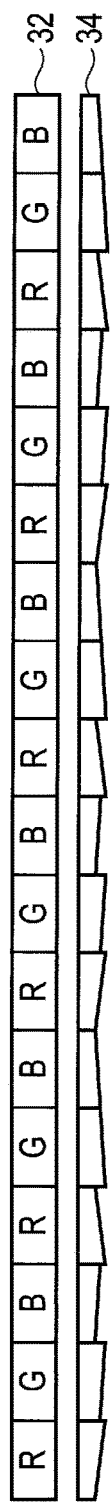
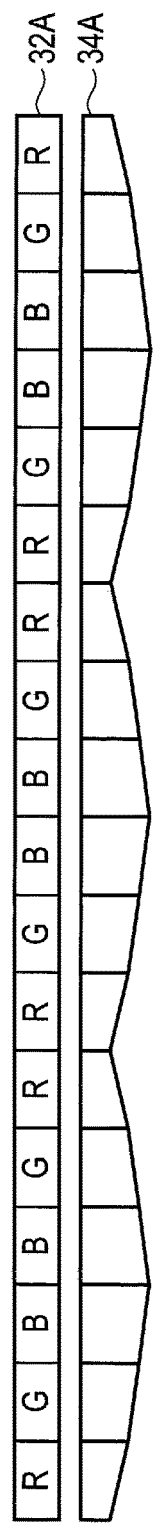
FIG. 10A  FIG. 10B  FIG. 10C

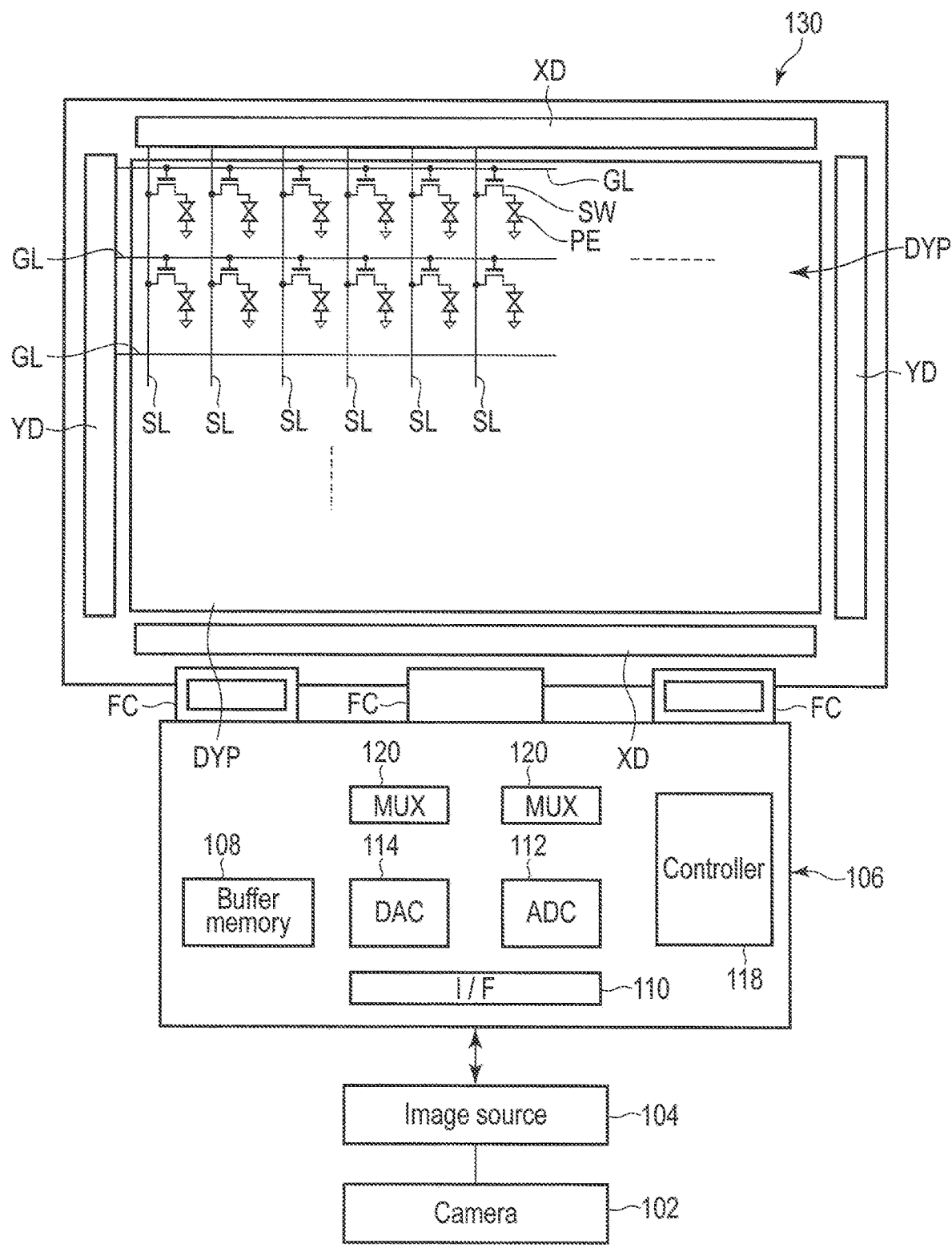
F I G. 13

DISPLAY DEVICE WITH PIXEL SHIFT ON SCREEN

CROSS-REFERENCE TO RELATED APPLICATIONS

This application is based upon and claims the benefit of priority from Japanese Patent Application No. 2017-009471, filed Jan. 23, 2017, the entire contents of which are incorporated herein by reference.

FIELD

Embodiments described herein relate generally to a display device.

BACKGROUND

A conventional three-dimensional display device makes an image for right eye and an image for left eye incident on right and left eyes of an observer and urges the observer to recognize a three-dimensional image.

According to the conventional three-dimensional display device, the observer needs to stay at a predetermined position to make the image for right eye incident on the right and the image for left eye incident on the eye of the observer. If the observer moves to a position other than the predetermined position, at least a part of the image for right eye is made incident on the left eye, at least a part of the image for left eye is made incident on the right eye, and image quality to be observed by the observer may be degraded.

SUMMARY

The present application generally relates to a display device displaying a high quality image.

According to the embodiment, a display device includes a display unit configured to display an image for right eye and an image for left eye. Resolution of the display unit is P pixels or more per inch. Pixel shift of the image for right eye and the image for left eye displayed on the display unit is 0.021×P pixels or less and one pixel or more.

BRIEF DESCRIPTION OF THE DRAWINGS

FIGS. 10A, 10B, and 10C illustrate yet another example of the prism filter used in the display device according to the embodiment.

FIG. 13 is a block diagram showing a specific configuration of the display device according to the embodiment.

DETAILED DESCRIPTION

Figure 1A:
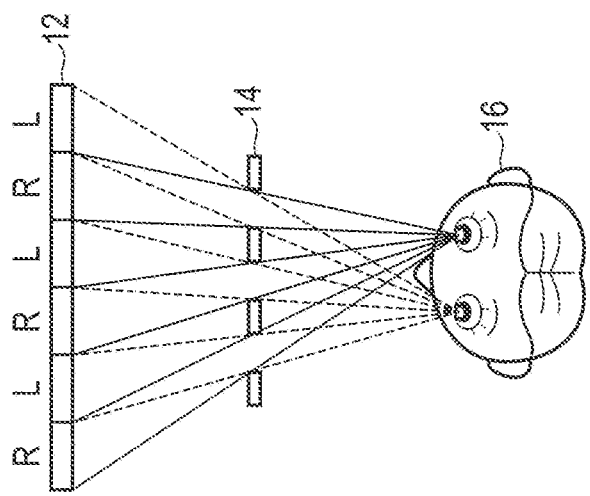
FIGS. 1A, 1B, and 1C illustrate an example of three-dimensional display in parallax barrier system.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

A liquid crystal display device will be explained as an example of the display device in the following descriptions. The embodiments are not limited to a liquid crystal display device but may be the other display device such as an organic EL device or a field emission display (FED). In addition, the display device according to the embodiment is not limited to a display device of a specific product, but can be applied to various products. Application examples can be implemented unlimitedly but several application examples will be explained here.

One of the application examples is a display device for automobile. An automobile includes an instrumental panel attached to a dashboard in front of a driver's seat and a display panel for car navigation generally mounted in front of a middle part between the driver's seat and a passenger seat. The display device according to the embodiment can be applied to these panels. The instrument panel displays meters such as a speedometer, a tachometer and a warning lamp and alarms (for driver assistance, autonomous driving, and the like). Furthermore, the instrument panel can also display simple car navigation images (for example, navigation of only corners for turning right or turning left, and the like) in free space on the screen. Furthermore, the display panel for car navigation can also be used as a rearview monitor. If a three-dimensional image is displayed on these display modules, improvement of visibility of the meters, alarms, and navigation screen, and promotion of safe driving are expected. If not only the driver, but also the passenger in the passenger seat recognize the three-dimensional image, they can compensate for a driver's mistake and the like. The display panel can be applied to instrument panels and the like for not only the automobile, but also all moving bodies such as motorcycles, trains, airplanes, and ships.

The other application example is a display device for medical use. A plurality of doctors conduct diagnoses and operations while capturing the inside of the body and affected parts and watching the captured images on a display device in endoscopic diagnoses and abdominal operations. If these images are three-dimensional images, fine parts surrounding the affected parts are clarified and the improvement of efficiency in endoscope operations and surgery is expected.

A further application example is a display device for amusement such as a game console, and the like.

[Three-Dimensional Image]

A three-dimensional image will be explained before explanation of a specific example of the display device according to the embodiment. Examples of the three-dimensional image display mode include parallax barrier mode and lenticular mode. In either of the modes, an image of a visual field from the right eye, i.e., an image for right eye and an image of a visual field from the left eye, i.e., an image for left eye are captured, and displayed alternately or simultaneously. The image for right eye and the image for left eye are thereby made incident on the right eye and the left eye, respectively. The observer is allowed to recognize the three-dimensional image.

Figure 1B:
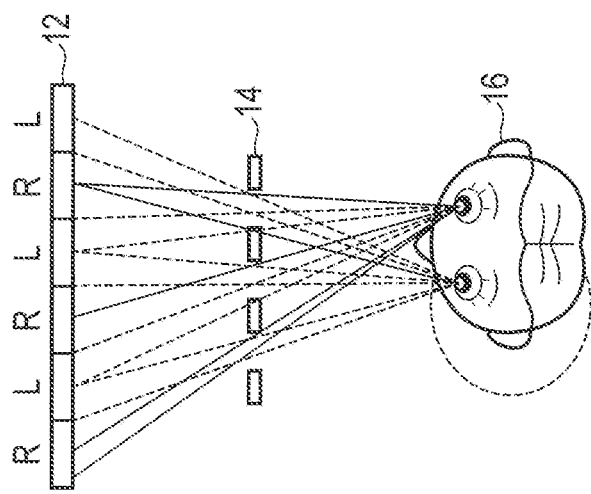
Figure 1C:
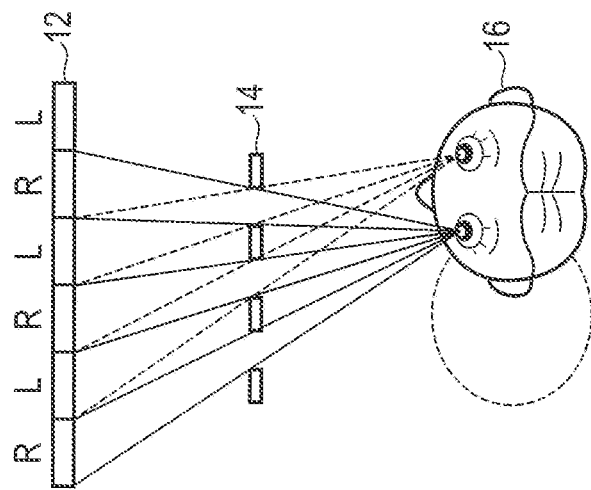

In the parallax barrier mode, as shown in FIGS. 1A, 1B, and 1C, a parallax barrier 14 is disposed parallel to a display panel 12, at a position between the display panel 12 and an observer 16. Plural narrow slits are provided in a longitudinal direction of the display screen, in the parallax barrier 14. The slits may be aligned in a direction intersecting a parallax direction, a perpendicular direction. The observer 16 observes a display image on the display panel 12 through the slits of the parallax barrier 14. The image for right eye and the image for left eye to display a three-dimensional image are divided laterally (perpendicular direction) and an image for right eye $I_R$ and an image for left eye $I_L$ in a longitudinally strip shape are thereby generated. An image formed by alternately arranging the image for right eye and the image for left eye in a strip shape is displayed on the display panel 12. A cycle of the slits is set to be similar to a cycle of the images $I_L$ and $I_R$ in a strip shape as seen from the observer 16 and an opening width of the slits is set to be similar to a width of the image for right eye $I_R$ and an image for left eye $I_L$ in a strip shape as seen from the observer 16. A distance between the parallax barrier 14 and the display panel 12 and a distance between the parallax barrier 14 and the observer 16 are set such that the only image for right eye $I_R$ displayed on the display panel 12 is made incident on the right eye of the observer 16 and the only image for left eye $I_L$ displayed on the display panel 12 is made incident on the left eye of the observer 16. For this reason, when the observer 16 is presented at a predetermined position remote from the display panel 12 in a predetermined distance, in front of the display panel 12, the image for right eye $I_R$ and the image for left eye $I_L$ alone are made incident on the right eye and left eye of the observer 16, respectively, as shown in FIG. 1A. The observer 16 can recognize the depth and also recognize the three-dimensional image by intracerebrally processing binocular disparity indicating a difference between the image for right eye $I_R$ reflected on retina of the right eye and the image for left eye $I_L$ reflected on retina of the left eye. Binocular disparity is often called binocular parallax. Binocular parallax often indicates parallax which is determined by the target and the eyeball position and does not depend on the direction of the line of sight but, in the present specification, binocular disparity is called binocular parallax.

When the position of the observer 16 moves from a predetermined position, for example, shifted from the position shown in FIG. 1A in a lateral direction parallel to the display panel 12 as shown in FIG. 1B, a part of the image for right eye $I_R$ and a part of the image for left eye $I_L$ are made incident on the right eye of the observer 16 while the remaining part of the image for right eye $I_R$ and the remaining part of the image for left eye $I_L$ are made incident on the left eye of the observer 16. For this reason, the observer 16 recognizes an indistinct or blurred two-dimensional image but cannot recognize a three-dimensional image. Thus, a situation in which at least a part of the image for right eye $I_R$ is made incident on the left eye and at least a part of the image for left eye $I_L$ is made incident on the right eye is called crosstalk. The display quality of the three-dimensional display is degraded as the rate of the crosstalk is larger. In other words, an observer at a predetermined position can recognize a three-dimensional image, but the passenger in the passenger seat, other doctor, and the like watching the same screen cannot recognize the three-dimensional image and can recognize the only indistinct or blurred two-dimensional image.

Furthermore, if the observer 16 moves and the crosstalk increases, the image for right eye $I_R$ alone is made incident on the left eye of the observer 16 and the image for left eye $I_L$ alone is made incident on the right eye of the observer 16, oppositely to the state shown in FIG. 1A, as shown in, for example, FIG. 1C. In this case, since the images different in light of sight are observed by the right and left eyes, the images are seen three-dimensionally but depth positions of two objects are opposed, i.e., pseudo stereoscopy. The observer's movement is not limited to shifting in the direction parallel to the display panel 12 but indicates movement in a direction intersecting the display panel 12 and movement in an oblique direction.

Figure 2A:
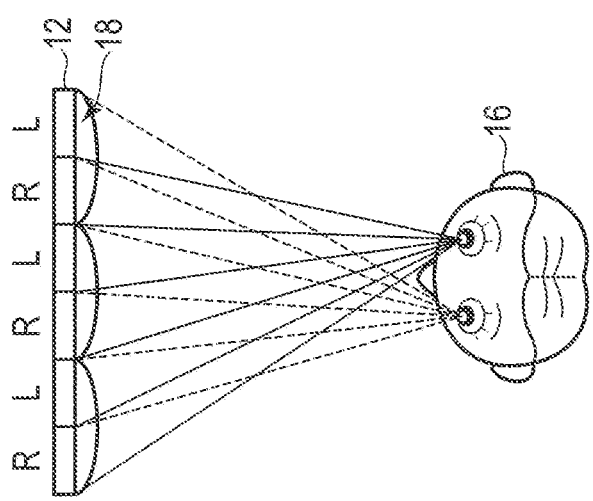
FIGS. 2A, 2B, and 2C illustrate an example of three-dimensional display in lenticular lens system.
Figure 2B:
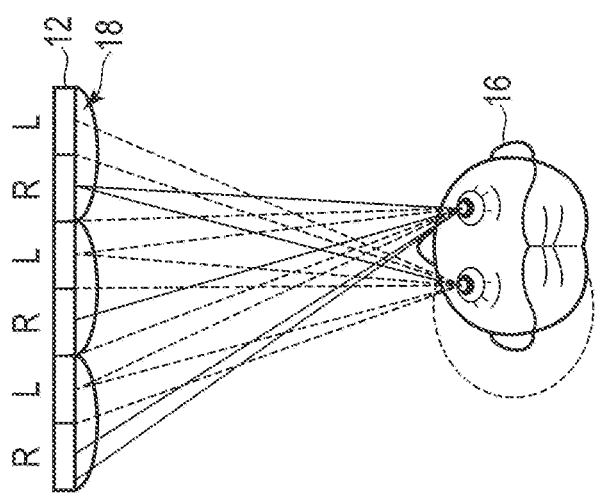
Figure 2C:
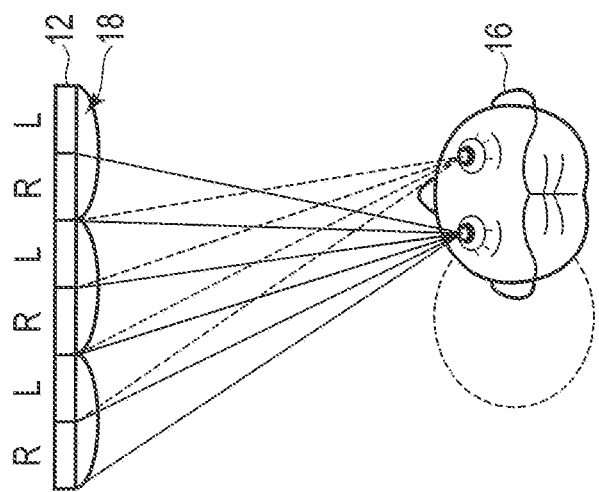

In the lenticular mode, as shown in FIGS. 2A, 2B, and 2C, longitudinally extending semi-cylindrical lenses 18 called lenticular lenses are arranged laterally and installed on the surface of the display panel 12 instead of the parallax barriers. Each of the lenticular lenses 18 is provided to correspond to a perpendicular pixel string (column) which displays a pair of the image for right eye $I_R$ and the image for left eye $I_L$ in a strip shape. A focal position of the lenticular lens 18 exists on the image display surface of the display panel 12. A light emission direction of the lenticular lens 18 is set such that the only image for right eye $I_R$ displayed on the display panel 12 is made incident on the right eye of the observer 16 and the only image for left eye $I_L$ displayed on the display panel 12 is made incident on the left eye of the observer 16. For this reason, when the observer 16 is presented at a predetermined position remote from the display panel 12 in a predetermined distance, in front of the display panel 12, the image for right eye $I_R$ and the image for left eye $I_L$ alone are made incident on the right eye and left eye of the observer 16, respectively, as shown in FIG. 2A. The observer 16 can recognize the three-dimensional image, based on the image for right eye $I_R$ and the image for left eye $I_L$ different in visual field.

When the observer 16 moves from a predetermined position, for example, shifted from the position shown in FIG. 2A in a lateral direction parallel to the display panel 12 as shown in FIG. 2B, a part of the image for right eye $I_R$ and a part of the image for left eye $I_L$ are made incident on the right eye of the observer 16 while the remaining part of the image for right eye $I_R$ and the remaining part of the image for left eye $I_L$ are made incident on the left eye of the observer 16. For this reason, the observer 16 recognizes an indistinct or blurred two-dimensional image but cannot recognize a three-dimensional image.

Furthermore, if the observer 16 moves and the crosstalk increases, the image for right eye $I_R$ alone is made incident on the left eye of the observer 16 and the image for left eye $I_L$ alone is made incident on the right eye of the observer 16, oppositely to the state shown in FIG. 2A, as shown in, for example, FIG. 2C and pseudo stereoscopy is caused. The observer's displacement is not limited to shifting in the direction parallel to the display panel 12 but indicates movement in a direction intersecting the display panel 12 and movement in an oblique direction.

[Pictorial Cues]

The binocular parallax is not the only factor which enables a human to recognize the image depth and recognize a three-dimensional image. In general, it is well known that a human recognizes an image as a three-dimensional image with total actions of (1) binocular parallax, (2) motion parallax (using a remote object moving slowly and a close object moving fast), and (3) pictorial cues (shading, perspective, size ratio, sensation of realness, and the like). For this reason, even if binocular parallax is small, the three-dimensional image can be recognized with motion parallax or pictorial cues. According to the embodiment, the three-dimensional image can be recognized with pictorial cues and the image for right eye and the image for left eye having small binocular parallax.

When the observer 16 moves from the predetermined position as shown in FIG. 1B and FIG. 2B, the observer recognizes not the three-dimensional image, but two images, i.e., the image for right eye and the image for left eye. If the binocular parallax of the image for right eye and the image for left eye is small, the observer at the displaced positions as shown in FIG. 1B and FIG. 2B recognizes the two-dimensional image with inconspicuous blur as compared with the case shown in FIG. 1B and FIG. 2B. If the pictorial cues are present, even if the position of the observer 16 greatly moves and the image for right eye $I_R$ alone is made incident on the left eye of the observer 16 and the image for left eye $I_L$ alone is made incident on the right eye of the observer 16, as shown in FIG. 1C and FIG. 2C, the observer can recognize a distinct or unblurred two-dimensional image without recognizing positions of the objects oppositely (pseudo stereoscopy). In addition, pseudo stereoscopy hardly occurs as the binocular parallax is smaller.

Figure 3:
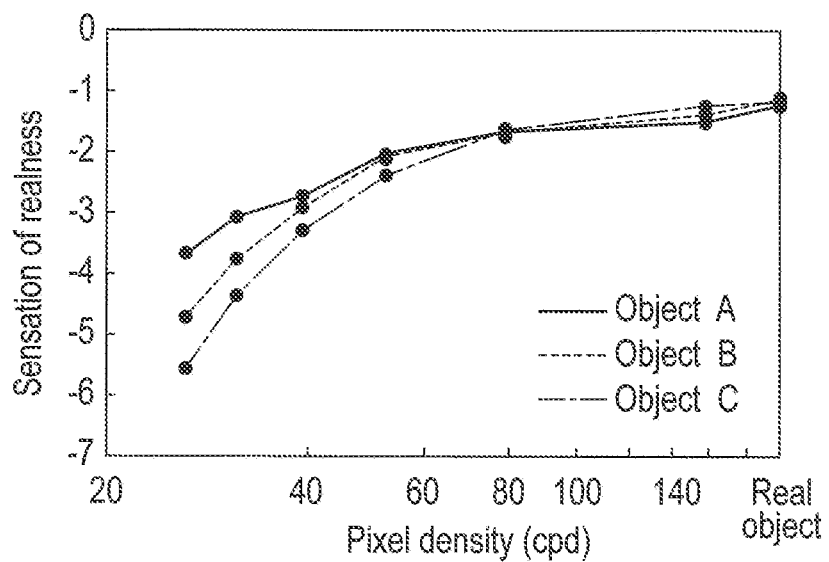
FIG. 3 is a graph showing an example of a relationship between a pixel density and sensation of realness.

An example of pictorial cues will be explained. Sensation of realness will be explained as an example. Sensation of realness is one of psychophysical effects of vision and indicates a degree of feeling of watching a real object. Sensation of realness is known as feeling related to spatial resolution (or pixel density) which is one of the video parameters. If the spatial resolution becomes high, the real object and the video image cannot be distinguished from each other. The spatial resolution indicates the number of pairs of black and white pixels that can be seen at each degree of the viewing angle in the horizontal direction, and is defined as cycles per degree (cpd). The upper limit of the pixel density at which a person having sight of 1.0 can sense the pixel structure is 30 cpd (sixty pixels per degree of visual field). As shown in FIG. 3, experiment results (average values) obtained by presenting pairs of video of six pixel densities of 26 cpd, 30 cpd, 40 cpd, 50 cpd, 80 cpd, and 155 cpd and the subject (real object) to a number of evaluators and urging the evaluators to determine which looks more similar to the real thing are known. FIG. 3 is shown in NHK Science & Technology Research Laboratories R&D No. 137/2013.1 (FIG. 2).

It can be understood from this result that on any object, sensation of realness is improved if the pixel density is 30 cpd or more and sensation of realness is approximately saturated if the pixel density is 60 cpd or more. For this reason, it can be understood that the pixel density of the display device needs to be 60 cpd or more to obtain sensation of realness (an example of the pictorial cues) which enables stereoscopic vision.

Since the pixel density is the observer's characteristic, this is converted into the resolution (pixels per inch; ppi) which is the characteristic of the display device. In a vehicle-mounted display device, a display device for medical use or the like, a visual range to the display screen is approximately 60 cm. The lower limit of the resolution (ppi) of the display device to achieve the pixel density of 60 cpd or more in a visual range of 60 cm can be obtained in a manner explained below.

A width of a pixel necessary for 60 cpd in the visual range of 60 cm is a distance on a circumference having a radius of 60 cm about the observer 16, and can be obtained in a manner explained below with trigonometric function.

Width of pixel=[tan(1/60 cpd)×60 cm/2] cm

The number of pixels per cm can be obtained from a reciprocal of the pixel width.

Number of pixels per cm=1/[tan(1/60 cpd)×60 cm/2]

Since 1 inch is equivalent to 2.54 cm, the number of pixels per inch (ppi) can be obtained in a manner explained below.

Number of pixels per cm=1/[tan(1/60 cpd)×60 cm/2]× 2.54≈291.0

For this reason, in the embodiment, the resolution of the display device is set to 300 ppi or more to achieve the pixel density of 60 cpd or more in the visual range of 60 cm. The resolution by which sensation of realness can be obtained is varied in accordance with the visual range. The resolution necessary to obtain sensation of realness becomes large if the observer and the display device are close to each other and the visual range is short and, oppositely, the resolution necessary to obtain sensation of realness becomes small if the observer and the display device are remote from each other and the visual range is long. As for a color image, the resolution is not the resolution of, for example, each of red (R), green (G), and blue (B) sub-pixels, but the resolution of pixels including sub-pixels.

[Binocular Parallax]

Figure 4:
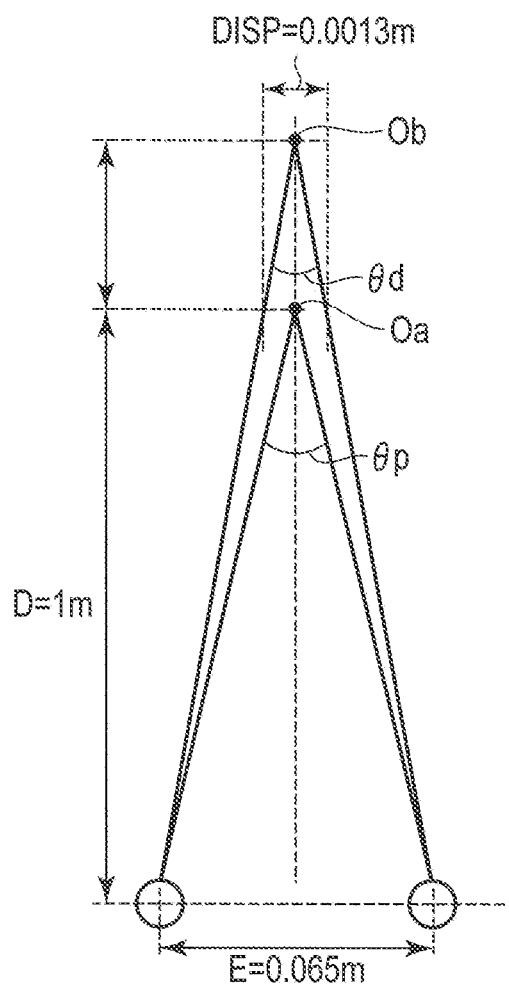
FIG. 4 illustrates an example of pixel shift between the image for right eye and the image for left eye.

Next, binocular parallax which is a factor of three-dimensional image recognition together with the pictorial cues (sensation of realness) will be explained with reference to FIG. 4. When the observer watches object Oa with the eyes, an image of object Oa is generated in the centers of the binocular retinae. At this time, an image of object Ob farther than object Oa (or a closer object not shown) is formed at different positions on the binocular retinae (not the centers of the binocular retinae). The difference between the positions on the retinae of images of objects Oa and Ob (also called pixel shift of image) is the binocular parallax and the depth clue.

Since sensation of realness is improved as the resolution becomes 300 ppi or more as explained above, the pictorial cues as the elements with which the object image can be visually recognized as three-dimensional image. For this reason, it was recognized that the three-dimensional object image can be visually recognized even if binocular parallax δ is made smaller. More specifically, if the resolution is set to 300 ppi in the visual range of 60 cm, the observer can recognize the three-dimensional image with binocular parallax δ of 4.3 arc min or less. Furthermore, if binocular parallax δ is 3 arc min or less, the problem of pseudo stereoscopy does not occur and the observer can recognize the three-dimensional image. If the resolution is set to 300 ppi with binocular parallax δ of 4.3 arc min or less in the visual range of 60 cm, degradation of the image quality is not recognized and the image is recognized as a general two-dimensional image even if crosstalk occurs. Furthermore, by setting binocular parallax δ to 3 arc min or less, the deterioration of image quality due to pseudo stereoscopy can be prevented and a clear two-dimensional image can be recognized when observed at a position of the pseudo stereoscopy.

For this reason, if the display device of the embodiment is applied to a vehicle, a three-dimensional image is recognized in the driver's seat while a distinct or unblurred two-dimensional image is recognized in the passenger seat. By changing the arrangement of the parallax barrier or lenticular lens and changing the image for right eye and the image for left eye, a three-dimensional image can be recognized in the passenger seat while a distinct or unblurred two-dimensional image can be recognized in the driver's seat, oppositely to the above case. If the display device according to the embodiment is applied to a medical use, a three-dimensional image is recognized in the main observer while a desirable two-dimensional image is recognized by other observers. In this case, the position of the main observer for the display device is not limited to a position in front of the display device, but may be a predetermined position displaced to the side surface. According to the embodiment, the position of the main observer recognizing a three-dimensional image can be set freely, and the other observers at the other positions can recognize a distinct or unblurred two-dimensional image.

If binocular parallax δ is 3 arc min, the width of shift DISP between the image for right eye and the image for left eye on the screen is as follows.

$$DISP = E - \tan[\arctan(E/2D) - \delta/2] \times 2D = 0.000874 \times D \text{ (m)}$$

$DISP$ is $0.000874 \times 0.6$ (m) where $D = 0.6$ m.

The length of a pixel on the screen of the display device having the resolution of 300 ppi is 2.54/300=0.08467 mm. It can be therefore understood that if the display device having the resolution of 300 ppi is used, the pixel shift of the images on the screen is (DIPS/0.08467)×1000≈6.19 (pixels) to make the three-dimensional image recognizable. The pixel shift which makes the three-dimensional image recognizable is varied in accordance with the resolution and becomes large as the resolution is made higher. For this reason, if the display device having the resolution of 300 ppi is used, the pixel shift of the images on the screen which makes the three-dimensional image recognizable is 6.19 pixels. If the resolution becomes 300 ppi or more, the pixel shift which makes the three-dimensional image recognizable becomes 6.19 pixels or more in proportion to the resolution.

In the embodiment, the three-dimensional image can be recognized by displaying the image for right eye and the image for left eye having the pixel shift on the display screen of 6.3 pixels (=0.021×300) larger than 6.19 pixels, by using the display device having the resolution of 300 ppi which is capable of obtaining sensation of realness in the visual range of 60 cm. The three-dimensional image can be recognized at an appropriate place and the two-dimensional image can be recognized at the other place so that the embodiment is useful for a glassless stereoscopic display. According to the embodiment, the resolution of the display unit is P pixels or more per inch, and the pixel shift between the image for right eye and the image for left eye displayed on the display unit is 0.021×P pixels or less. In contrast, the lower limit which makes the image recognizable as a stereoscopic image is about 2 arc sec. Thus, the lower limit of the pixel shift is set to 0.00023×P pixels. Therefore, the lower limit of the pixel shift in a case where the resolution is 300 ppi is calculated at 0.07 (0.00023*300 pixels) or more, which is rounded up to 1 pixel.

[Prism Filter]

The lenticular lens (FIGS. 2A, 2B, and 2C) and the parallax barrier (FIGS. 1A, 1B, and 1C) are used as an example of the optical element for making the image for right eye incident on the right eye and making the image for left eye incident on the left eye in the above explanations. Another example of the optical element will be explained below. For example, even if a prism filter in which a prism is arranged for each of sub-pixels of a plurality of color components, for example, R, G, and B sub-pixels constituting one pixel is used, the image for right eye can be made incident on the right eye and the image for left eye can be made incident on the left eye.

Figure 5A:
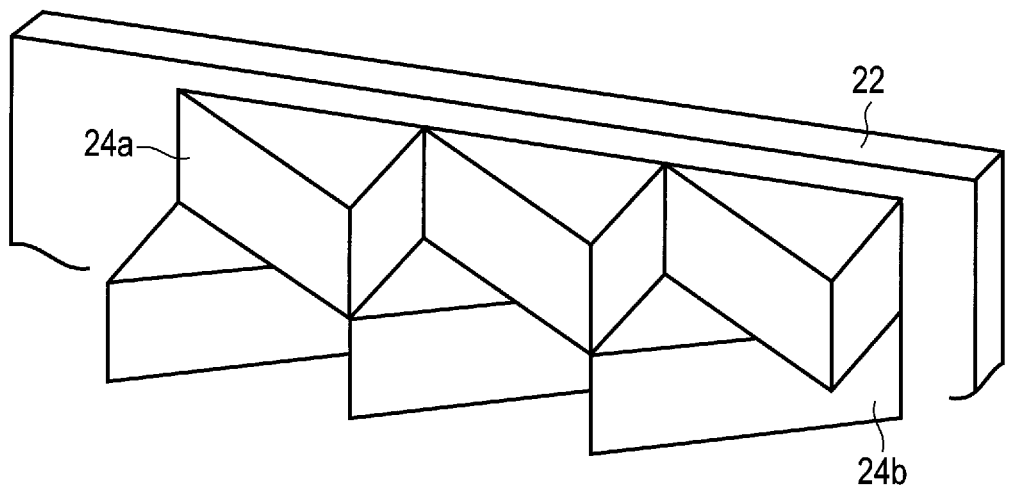
FIGS. 5A, 5B, and 5C illustrate an example of a prism filter used in the display device according to the embodiment.
Figure 5B:
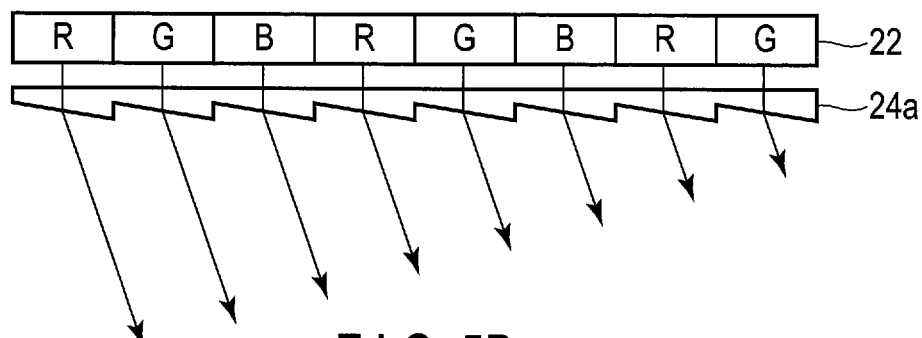
Figure 5C:
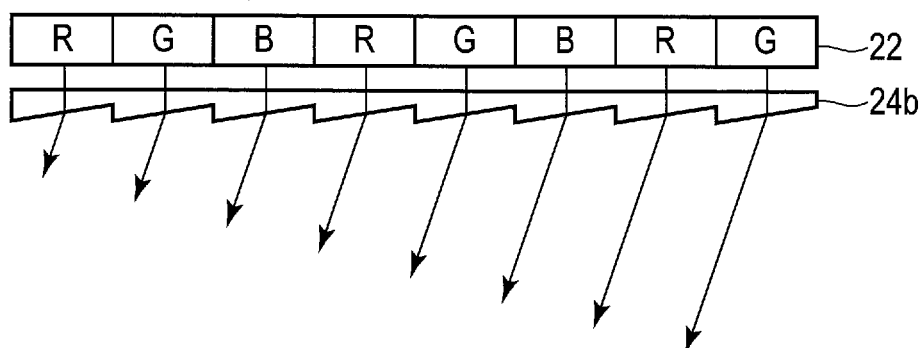

FIG. 5A shows an example of arranging prism filters 24a and 24b different in light emitting direction in each horizontal line (row direction) of the display unit. FIG. 5A shows two horizontal lines alone, but the prism filters 24a and 24b in the two lines are disposed repeatedly. For example, the prism filter 24a which emits the light shown in FIG. 5B in the direction of the right eye is attached to the odd-numbered line of the display panel 22 while the prism filter 24b which emits the light shown in FIG. 5C in the direction of the left eye is attached to the even-numbered line of the display panel 22. The prism filter 24a is composed of a number of prisms, and the prisms are arranged to correspond to R, G, and B sub-pixels. Since the parallax barrier (slits) and the lenticular lens are arranged in the longitudinal direction (vertical direction), the image for right eye and the image for left eye are divided in the lateral direction (horizontal direction), the image for right eye $I_R$ and image for left eye $I_L$ shaped in a longitudinal strip (vertical strip) are alternately arranged in the lateral direction (horizontal direction) to display one image. However, when the prism filters 24a and 24b shown in FIGS. 5A-5C are used, the image for right eye and the image for left eye are divided in the lateral direction (horizontal direction), and the image for right eye and image for left eye shaped in a lateral strip (horizontal strip) are alternately arranged in the longitudinal direction (vertical direction) to display one image.

Figure 6A:
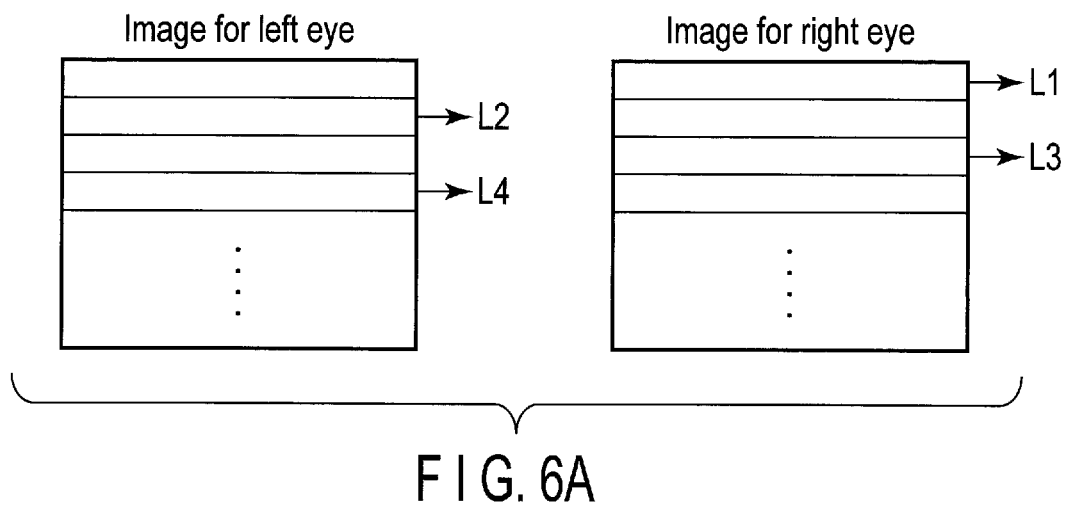
FIGS. 6A and 6B illustrate an example of situations of supplying a pixel signal to each line of a display panel comprising the prism filter shown in FIG. 5A.

For example, if the horizontal lines of one screen are N lines, each of the image for right eye and the image for left eye is divided in the lateral direction (horizontal direction) into N lateral strips (horizontal strips), which are partial images of N horizontal lines as shown in FIG. 6A. As for the image for right eye, the partial images in the odd-numbered rows are displayed in odd-numbered lines L1, L3, . . . of the display panel 22 and the partial images of the even-numbered rows are not displayed. As for the image for left eye, the partial images in the even-numbered rows are displayed in even-numbered lines L2, L4, . . . of the display panel 22 and the partial images of the odd-numbered rows are not displayed.

Figure 6B:
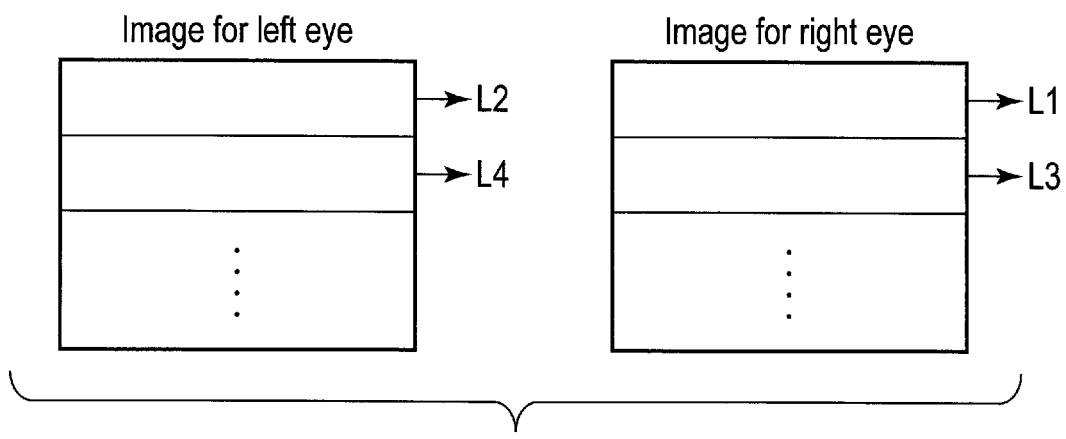

Alternatively, each of the image for right eye and the image for left eye is divided in the lateral direction (horizontal direction) into (N/2) pieces, which are partial images of (N/2) horizontal lines as shown in FIG. 6B. The partial image in the first row of the image for right eye is displayed in the first horizontal line L1 of the display panel 22 while the partial image in the first row of the image for left eye is displayed in the second horizontal line L2 of the display panel 22. Similarly, the partial image in the second row of the image for right eye is displayed in the third horizontal line L3 of the display panel 22 while the partial image in the second row of the image for left eye is displayed in the fourth horizontal line L4 of the display panel 22.

Thus, since the light emitting directions of the image for right eye and the image for left eye displayed on the display panel 22 are controlled by the prism filters 24a and 24b, the image for right eye and the image for left eye are made incident on the right eye and the left eye, respectively, and the observer can recognize the three-dimensional image.

Figure 7A:
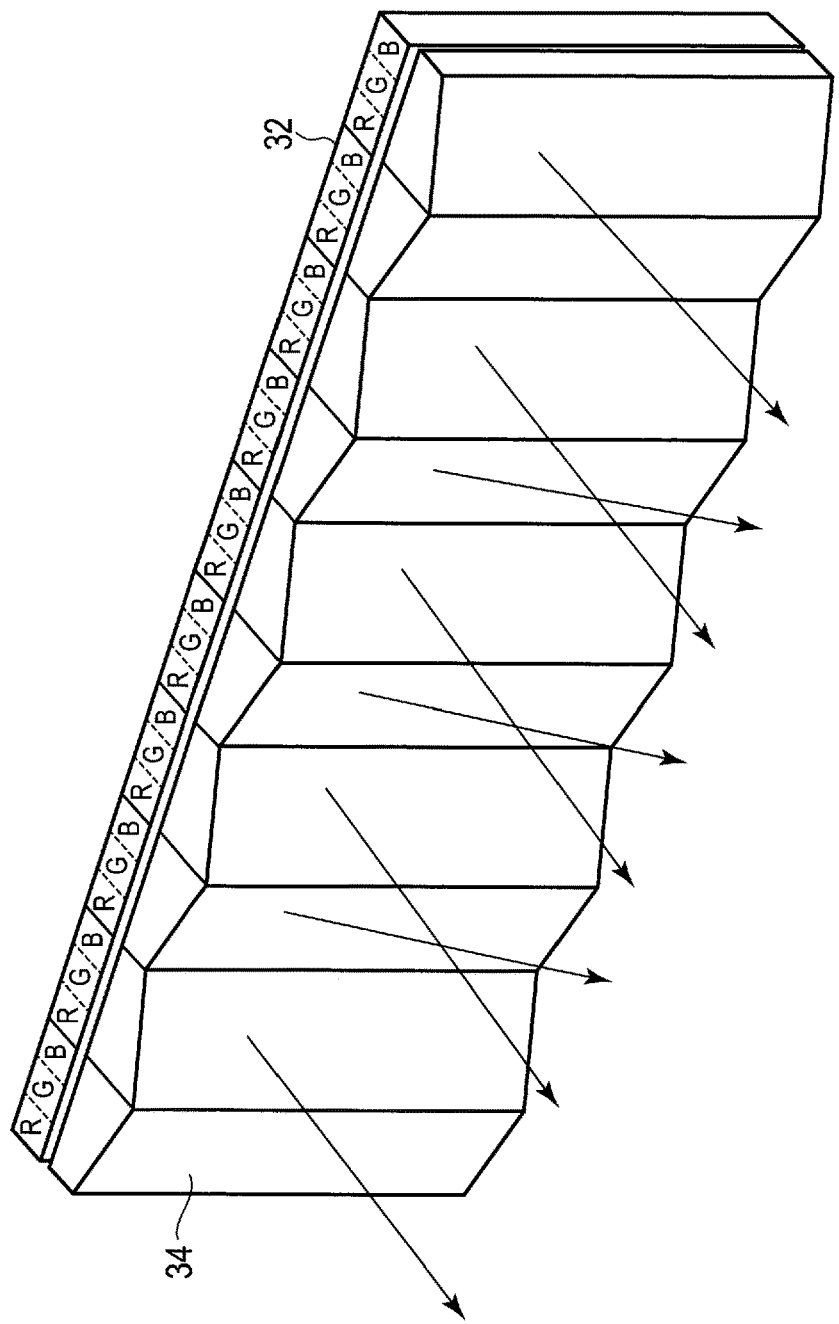
FIGS. 7A and 7B illustrate another example of the prism filter used in the display device according to the embodiment.
Figure 7B:
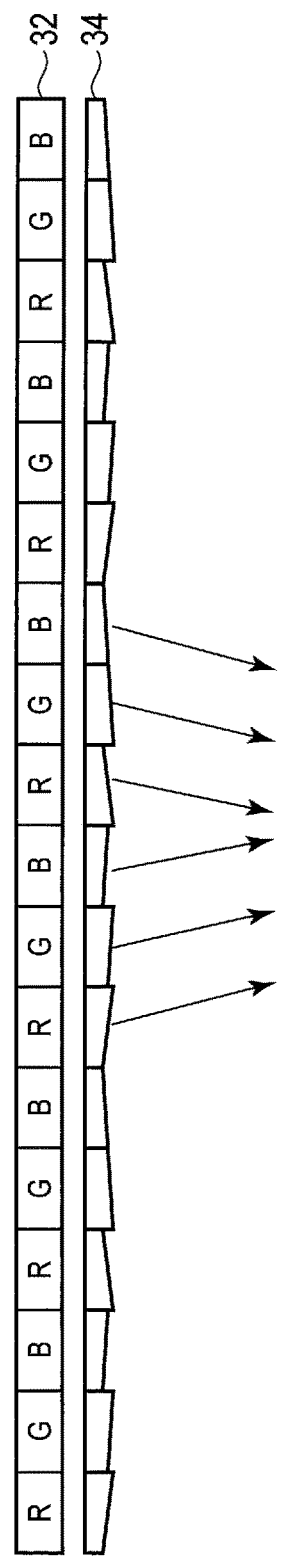

A second example using the prism filter is shown in FIGS. 7A-7B. A prism filter 34 configured to differentiate the light emission direction for not each horizontal line, but each vertical line (column direction) is attached to the display panel 32 as shown in FIG. 7A. One vertical line of the prism filter 34 corresponds to one pixel, and one pixel is composed of sub-pixels of R, G, and B. For example, the prism filter 34 is configured to emit the light to the right eye direction in the odd-numbered columns and to emit the light to the left eye direction in the even-numbered columns. FIG. 7B is a cross-sectional view showing the horizontal line of the display panel 32. One pixel is composed of three sub-pixels of R, G, and B on the display panel 32, similarly to the case shown in FIGS. 5A-5C.

In the example shown in FIGS. 5A-5C, the image for right eye, and the image for left eye are divided in the horizontal direction, the partial images of the horizontal lines are generated, and the partial images for right eye and the partial images for left eye are selectively displayed in each display row but, in the example shown in FIGS. 7A-7B, the image for right eye and the image for left eye are divided in the vertical direction, the partial images of the vertical lines are generated, and the partial images for right eye and the partial images for left eye are selectively displayed in each column.

Since the refractive index n of resin or glass which is the material of the prism filter 34 is varied in accordance with the wavelength of light, the prism is provided for not each sub-pixel, but every three sub-pixels as shown in FIGS. 7A-7B and the prism shapes are varied in accordance with the refractive index. The prism filter 34 corresponding to one pixel (three sub-pixels) has the same shape for convenience in FIG. 7A but, actually, the shape of the prism filter 34 is varied for each sub-pixel as shown in FIG. 7B. If the shapes of the prisms of three sub-pixels of R, G, and B are the same, the emission angles of R, G, and B light beams are different. Thus, the positions of the pixels emitting the light beams incident on the observer is shifted, and the image quality is degraded. If the shape of the prism filter 34 is designed for each sub-pixel in accordance with the refractive index, the prism shape can compensate for degradation in image quality. The shapes of the prism filters 24a and 24b shown in FIGS. 5A-5C can also be designed for each sub-pixel.

Figure 8A:
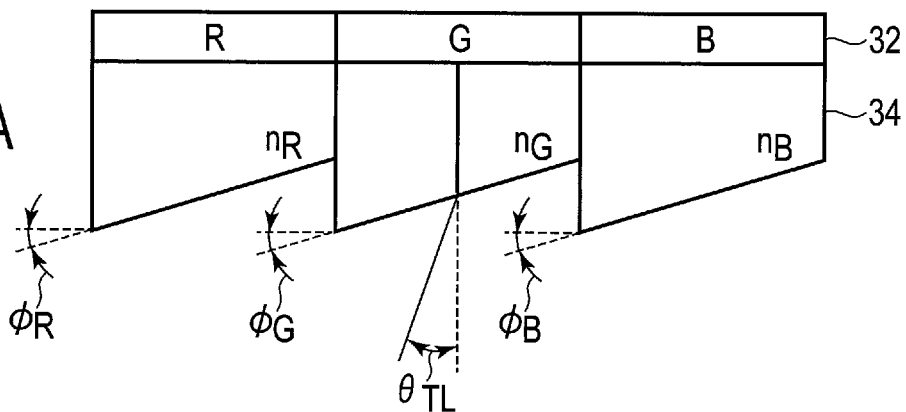
FIGS. 8A and 8B illustrate an example of design of the prism filter shown in FIG. 5A.
Figure 8B:
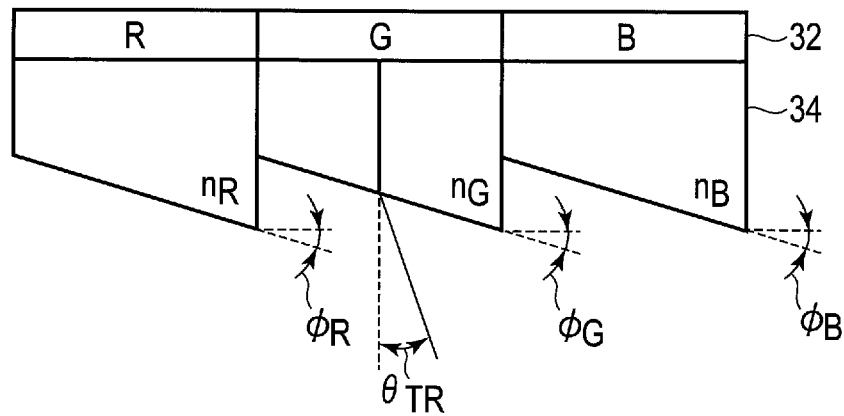

A method of obtaining refraction face angles (angles made between refraction faces emitting the light and the display panel 32) $\phi_R$, $\phi_G$, and $\phi_B$ of the prism filters 24a, 24b, and 34 for the respective R, G, and B sub-pixels shown in FIGS. 5A-5C and FIGS. 7A-7B will be explained with reference to FIGS. 8A-8B. FIG. 8A shows a prism filter of even-numbered columns which emit the light in the left eye direction while FIG. 8B shows a prism filter of odd-numbered columns which emit the light in the right eye direction. The prism filters 24a, 24b, and 34 are formed of resin, for example, polymethyl methacrylate resin. When the refractive indices of polymethyl methacrylate resin to R, G, and B light beams are denoted by $n_R$, $n_G$, and $n_B$, the light emission angle $\theta_T$ of R, G, and B light beams is represented as follows.

$$\arcsin(n_C \sin(\phi_C)) - \phi_C = \theta_T$$

Refractive index $n_C$ is composed of refractive indices $n_R$, $n_G$, and $n_B$ of the respective wavelengths of light, which are $n_R$=1.4880, $n_G$=1.4913, and $n_B$=1.4974. Refraction face angle $\phi_C$ is composed of $\phi_R$, $\phi_G$, and $\phi_B$. Light emission angle $\theta_T$ is composed of $\theta_{TL}$ and $\theta_{TR}$ (each varied for each color).

When refractive index $n_C$ and light emission angle $\theta_T$ of polymethyl methacrylate resin are determined, refraction face angles $\phi_R$, $\phi_G$, and $\phi_B$ of the prisms of the respective R, G, and B sub-pixels are obtained. These refraction face angles are obtained with wavelengths $\lambda_R$=655 nm, $\lambda_G$=590 nm, and $\lambda_{GB}$=485 nm, respectively.

Figure 9:
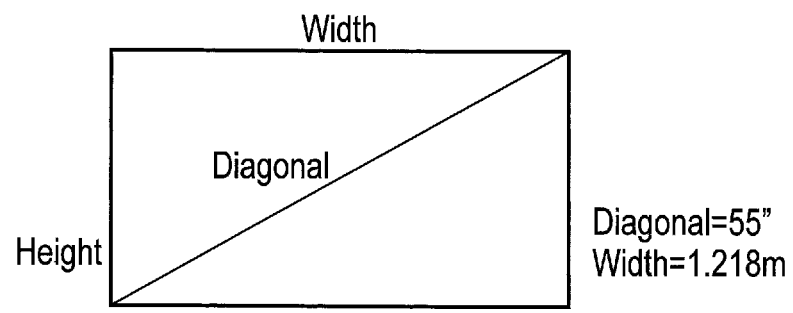
FIG. 9 illustrate an example of design of the prism filter shown in FIG. 5A.
Figure 9:
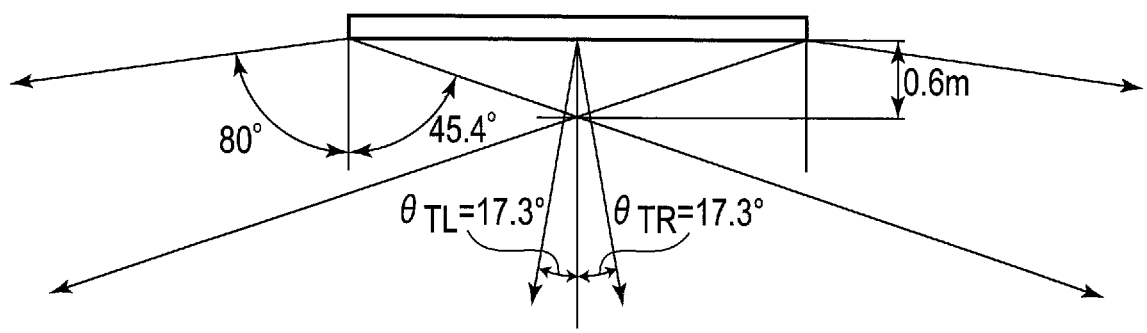

FIG. 9 shows the light emission angle $\theta_T$ obtained when a 55-inch (horizontal size of screen: 1.218 m) display is observed in the visual range of 60 cm. If it is assumed that the display can be approached in up to 60 cm and can be seen from the surrounding at up to 80 degrees, the barycenter of emission angle θ is 17.3 degrees which is an average of 80 degrees and −45.4 degrees.

The prism filters shown in FIGS. 5A-5C and FIGS. 7A-7B achieve the same advantage on recognition of the three-dimensional image. When the prism filters shown in FIGS. 5A-5C and FIGS. 7A-7B are compared in view of facility of manufacturing, a mold of the prism filter shown in FIGS. 7A-7B in which the shape is arranged in the vertical direction can be processed slightly more easily and its manufacturing costs are lower.

If the refraction face angles of the prisms of the R, G, and B sub-pixels are set to be the same without considering the refractive index of each wavelength, the emission angles of R, G, and B light beams are shifted and the positions of the pixels emitting the light beams reaching the observer's retinae of the R, G, and B color component images, is shifted. This amount of shift is calculated to approximately 0.159315 degrees, based on the difference between the R and B emission angles, by a prism of polymethyl methacrylate resin, when the refraction face angle φ is 15.7 degrees. For this reason, if 20-inch HD display (horizontal size of screen: 44.3 cm) is observed in a visual range of 60 cm, the pixel position is shifted by 7.2 pixels on the display screen and the image quality is degraded. If the material of low wavelength dispersion (small difference in refractive index for each wavelength) is selected as the resin of the prisms, the shift can be minimized or canceled but the costs are increased by the material. If the refraction face angle φ is optimized for each of the R, G, and B sub-pixels and emission angles $\theta_{TL}$ and $\theta_{TLR}$ of the R, G, and B light beams are adjusted as shown in FIGS. 8A-8B and FIG. 9, the positions of the pixels emitting the light beams reaching the observer's retinae, of the R, G, and B color component images, can be made the same by even using prisms of low cost resin.

[Sub-Pixel Alignment]

As explained above, one pixel of the display device is composed of three R, G, and B sub-pixels and, generally, the three R, G, and B sub-pixels (or color filters) are aligned cyclically. The prisms corresponding to R, G, and B are different in refraction face angle, the refraction face angle of the prism corresponding to R is the largest and the refraction face angle of the prism corresponding to B is the smallest. For this reason, if the R, G, and B sub-pixels are aligned cyclically in this order, the refraction face angles of the prisms are repeatedly varied for each of the sub-pixels as shown in FIG. 10A. Thus, manufacturing the prism filter having recesses and projections for each of the sub-pixels may be slightly difficult.

If the cycle of the alignment of the sub-pixels is set to a cycle of R, G, B, B, G, and R (two pixels) and is repeated, the manufacturing may be facilitated.

For example, as shown in FIG. 10B, the alignment of the sub-pixels of R, G, B, B, G, and R is defined as one cycle and repeated, and the thickness of each of the prisms corresponding to the R, G, and B sub-pixels is increased by a predetermined amount, such that the refraction surface is substantially continuous in three continuous sub-pixels of R, G, and B and three continuous sub-pixels of B, G, and R. The predetermined amount for the R, G, and B sub-pixels is determined such that the prism corresponding to the B sub-pixel is made the thickest and the prism corresponding to the R sub-pixel is made the thinnest. Thus, the refraction face angle of a prism filter 34A becomes approximately constant for the sub-pixels of R, G, and B in the former part of one cycle, and also becomes approximately constant for the sub-pixels of B, G, and R in the latter part of one cycle. For this reason, since the shape of the refraction surface of the prisms is varied in units of six sub-pixels (two pixels) and the cycle of irregularities is long, the prism filter 34A may be manufactured more easily than that shown in FIG. 10A. The perspective view of the prism filter 34A shown in FIG. 10B is the same as FIG. 7A.

In FIG. 10C, the thickness of the prisms corresponding to the R, G, and B sub-pixels is the same as that in FIG. 10A, and the alignment of the sub-pixels is composed of a cycle of R, G, B, B, G, and R and is repeated. Thus, since the shape of the refraction surface of the prism filter 34B is varied in units of six sub-pixels and the thickness of each prism is approximately constant, the prism filter may be manufactured more easily than that shown in FIG. 10A.

The above explanations are made on the assumption that each of the horizontal lines of the display panels 22 and 32 is composed of three sub-pixels of R, G, and B for each pixel, the alignment of the sub-pixels has several modified examples, but the all the horizontal lines are the same sub-pixel alignments.

Figure 11A:
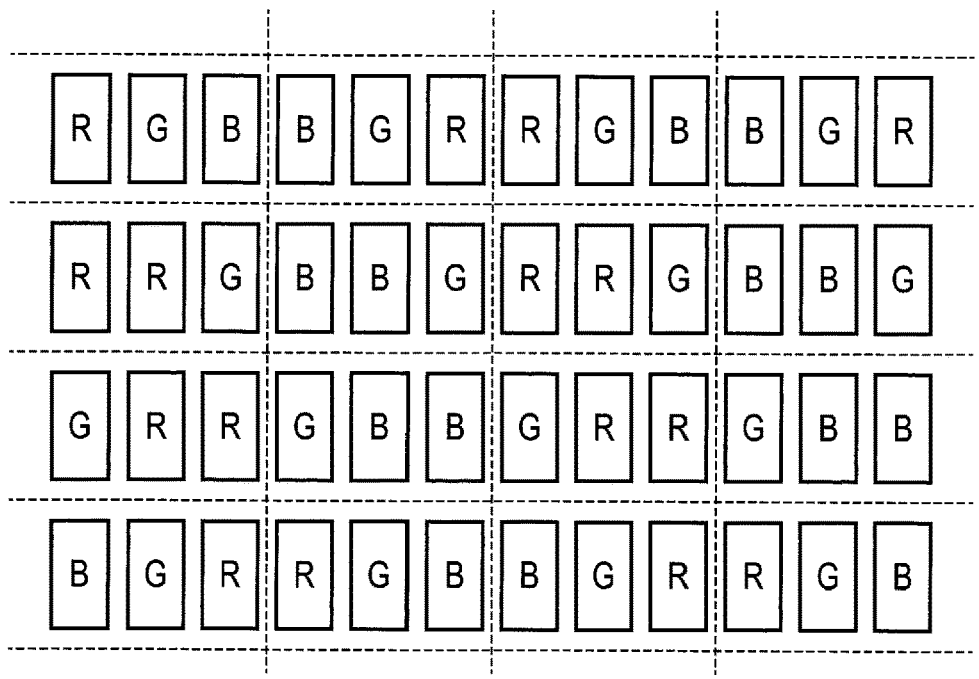
FIGS. 11A and 11B illustrate an example of sub-pixel alignment and an example of a prism filter in the display device according to the embodiment.

FIG. 11A shows an example of alignment of the sub-pixels on the whole display panel. The alignment of the sub-pixels in each horizontal line is composed of a cycle of six sub-pixels of R, G, B, B, G, and R and is repeated, similarly to that in FIGS. 10B-10C. For example, in the first line, R, G, and B sub-pixels are aligned in this order from the left, in the left pixel of two adjacent pixels, and B, G, and R sub-pixels are aligned in this order from the left, in the right pixel of two adjacent pixels. In the second horizontal line adjacent to the first horizontal line, the alignment of the sub-pixels is shifted by one sub-pixel. In other words, the pixel in the second line located under the left pixel composed of the sub-pixels of R, G, and B in the first line is composed of the sub-pixels of R, R, and G, and the pixel in the second line located under the right pixel composed of the sub-pixels of B, G and R in the first line is composed of the sub-pixels of B, B, and G. For this reason, the sub-pixels of the same color are aligned obliquely from the upper left side to the lower right side.

Figure 11B:
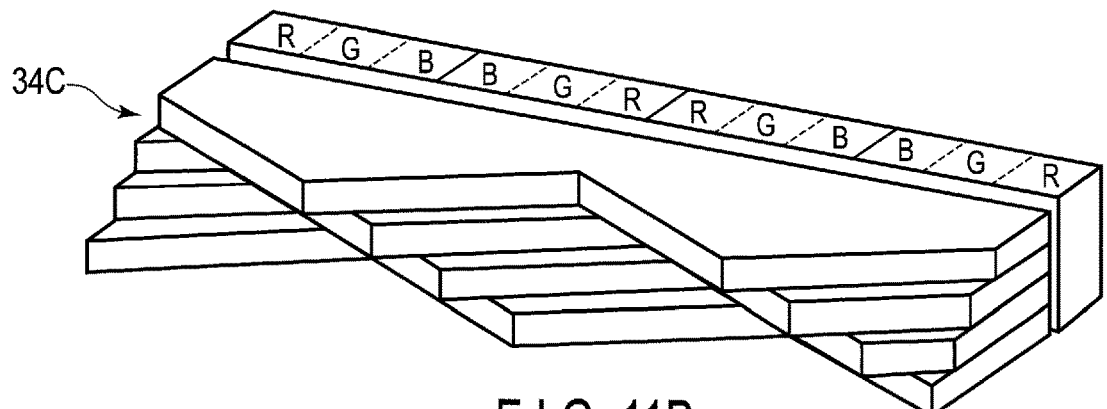

FIG. 11B is a perspective view showing an example of a prism filter 34C used in the display device shown in FIG. 11A. The prism filter 34C of one horizontal line may comprise the configuration shown in FIG. 10B or FIG. 10C, and may be attached to the display device while shifted by one sub-pixel in each horizontal line. FIG. 11B shows an example of using the prism filter 34C in which each horizontal line is configured as shown in FIG. 10B. It may possible to configure the prism filter 34C in which each horizontal line is configured as shown in FIG. 10C. If the alignment of the sub-pixels is shifted in each line, interference of a longitudinal outline component and an emitted light component is avoided and the image quality is improved. The direction of shifting the second line with regard to the first line may be opposite to the direction of FIGS. 11A-11B, and the shift amount may not be one sub-pixel, but a plurality of sub-pixels.

The alignment of the sub-pixels shown in FIGS. 5A-5C, FIGS. 7A-7B, and FIGS. 10A-10C, i.e., the alignment of the color filters is not only applied to the display device in which the resolution to display the image for right eye and the image for left eye is 300 ppi and the image for right eye and the image for left eye has the pixel shift of 6.19 pixels. The alignment of the color filters can also be applied to a general display device of low resolution which executes three-dimensional display based on the image for right eye and the image for left eye having large pixel shift.

[Circuit Configuration]

Figure 12:
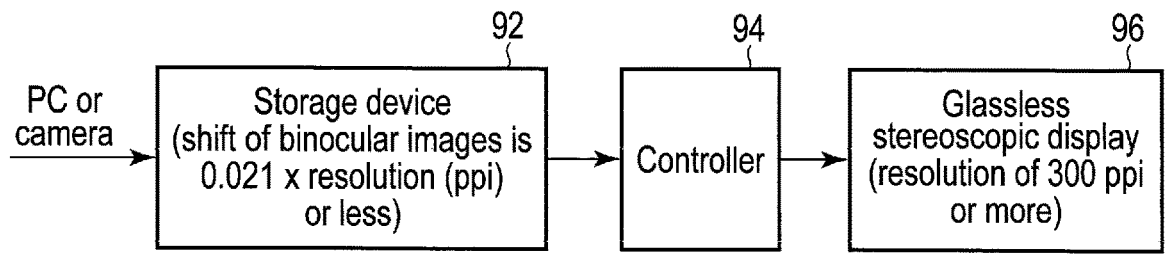
FIG. 12 is a block diagram showing a basic configuration of the display device according to the embodiment.

FIG. 12 is a block diagram showing an example of a basic configuration of the three-dimensional image display device. The display device is composed of a storage device 92, a controller 94, and a glassless stereoscopic display 96. The glassless stereoscopic display 96 comprises an optical system of making the image for right eye incident on the right eye and making the image for left eye incident on the left eye as shown in FIGS. 5A-5C, FIGS. 7A-7B, FIGS. 10A-10C, or FIGS. 11A-11B, and is composed of a liquid crystal display or organic EL display having the resolution of 300 ppi or more on an assumption that the images are observed in the visual range of 60 cm. The image for right eye and the image for left eye are input from a PC or camera to the display device and stored in the storage device 92. Examples of the image for right eye and the image for left eye stored in the storage device 92 include the images captured by a three-dimensional camera having small parallax or three-dimensional images generated by a graphics controller of a personal computer. An example of the latter may include an image of an automobile's speedometer or the like. The pixel shift between the image for right eye and the image for left eye is 0.021×P pixels on the display screen where the resolution of the display unit is P pixels. The controller 94 drives each of the pixels of the glassless stereoscopic display 96 such that the image for right eye and the image for left eye are alternately arranged in the lateral direction (horizontal direction) as shown in FIGS. 5A-5C, or in the longitudinal direction (vertical direction) as shown in FIGS. 7A-7B, FIGS. 10A-10C, or FIGS. 11A-11B.

FIG. 13 is a block diagram showing an example of a concrete example of the three-dimensional image display device. The display device includes a liquid crystal display panel 130 and a circuit board 106. The liquid crystal display panel 130 includes a liquid crystal layer (not shown) sandwiched between the array substrate and the counter-substrate, a display unit DYP composed of a plurality of pixels arrayed in a matrix, and a backlight (not shown).

The display unit DYP includes a transparent insulating substrate (not shown), pixel electrodes arrayed in a matrix so as to correspond to the respective display pixels on the transparent insulating substrate. Scanning lines GL are arranged in rows and signal lines SL are arranged in columns. Pixel electrodes PE and pixel switches SW are arranged near positions at which the scanning lines GL and the signal lines SL intersect. Scanning line drive circuits YD and signal line drive circuits XD are arranged in the surrounding of the display unit DYP.

A color filter composed of R, G, and B color components shown in FIGS. 5A-5C, FIGS. 7A-7B, FIGS. 10A-10C, or FIGS. 11A-11B is provided on the transparent insulating substrate, though not illustrated in FIG. 13. Each of the color components of the color filter corresponds to a pixel electrode PE. One pixel electrode PE corresponds to a sub-pixel and three pixel electrodes PE correspond to one pixel. The pixel resolution of the display unit DYP is 300 ppi or more.

The lenticular lens 18 shown in FIGS. 2A-2C or the prism filter shown in FIGS. 5A-5C, FIGS. 7A-7B, FIGS. 10A-10C, or FIGS. 11A-11B is provided to facilitate recognition of the three-dimensional image, though not illustrated in the drawing. Alternatively, the parallax barrier 14 may be provided between the display device and the observer to facilitate recognition of the three-dimensional image, as shown in FIGS. 1A-1C.

The pixel switch SW includes a thin film transistor including a polysilicone or amorphous semiconductor layer. A gate electrode of the pixel switch SW is electrically connected to (or formed integrally with) the corresponding scanning line GL. A source electrode of the pixel switch SW is electrically connected to (or formed integrally with) the corresponding signal line SL. A drain electrode of the pixel switch SW is electrically connected to (or formed integrally with) the corresponding pixel electrode PE.

The scanning line drive circuits YD are disposed on both sides of the display unit DYP in a direction of the scanning lines GL and are electrically connected to the scanning lines GL. Each of the scanning line drive circuits YD sequentially outputs drive signals to the scanning lines GL, based on a vertical synchronization signal and a clock signal received from the circuit board 106.

The signal line drive circuits XD are disposed on both sides of the display unit DYP in a direction of the signal lines SL and are electrically connected to the signal lines SL. Each of the signal line drive circuits XD outputs video signals received from the circuit board 106 to the signal lines SL in parallel.

An end of each of flexible substrates FC is electrically connected to an end portion of the liquid crystal display panel 130. The circuit board 106 is electrically connected to the other end of the flexible substrate FC. The circuit board 106 includes a buffer memory 108, multiplexers (MUXs) 120, a D/A converter (DAC) 114, an A/D converter (ADC) 112, an interface (I/F) 110 executing signal transmission and reception with an external image source 104 for generating an image for right eye and an image for left eye, and a controller 118.

The image for right eye in the visual field from the right eye and the image for left eye in the visual field from the left eye are captured by a stereo camera 102. The image source 104 receives an image signal for right eye and an image signal for left eye from the stereo camera 102, divides the image for right eye and the image for left eye in the horizontal direction or the vertical direction, generates partial images for right eye and partial images for left eye in the horizontal line or the vertical line, and outputs the image obtained by alternately combining the partial images for right eye and the partial images for left eye. The pixel shift between the image for right eye and the image for left eye is 0.021×P pixels on the display screen. P represents the resolution of the display device (number of pixels per inch). The image for right eye and the image for left eye do not necessarily need to be input to the image source 104 but may be supplied from the server, the host device, or the like to the image source 104.

An output image signal of the image source 104 is written to the buffer memory 108 via the interface (I/F) 110. The buffer memory 108 is composed of, for example, a volatile semiconductor memory capable of storing an image signal of several frames. The image signal is read from the buffer memory 108 in each frame in accordance with the display cycle of the display unit DYP and is supplied to the controller 118.

The controller 118 generates the synchronization signal from the image signal, outputs the vertical synchronization signal to the scanning line drive circuits YD, and outputs the horizontal synchronization signal and the image signal to the signal line drive circuits XD. The scanning line drive circuits YD and the signal line drive circuits XD drive each of the pixel switches SW, based on the image signal and the synchronization signals, and execute display drive such that a gradation voltage of a potential line selected from plural potential lines is supplied to the corresponding liquid crystal layer via each of the pixel electrodes PE.

The scanning line drive circuits YD select the pixel electrodes PE to be driven in linear sequence (i.e., execute linear sequence scanning), by sequentially selecting the pixels for each of the horizontal lines with the scanning lines (gate lines) GL extending in the horizontal line (row) direction.

The signal line drive circuits XD supply the image signals to the pixel electrodes PE to be driven, with the signal lines (data lines) SL extending in the vertical line (column) direction. The signal lines SL are supplied with 1-bit video signals composed of binary digital data. The liquid crystal layer corresponding to each of the pixel electrodes PE is thereby driven to display in accordance with the image signals.

The above-explained specific circuit configuration of the display device is a mere example and is not limited to this. For example, the embodiment can be applied to, for example, what is called a touch-panel display device incorporating a sensor electrode which detects a user's touch operation by electrostatic capacitance.

The present invention is not limited to the embodiments described above, and the constituent elements of the invention can be modified in various ways without departing from the spirit and scope of the invention. For example, various aspects of the invention can also be extracted from any appropriate combination of constituent elements disclosed in the embodiments. For example, some of the constituent elements disclosed in the embodiments may be deleted. Furthermore, the constituent elements described in different embodiments may be arbitrarily combined.

What is claimed is:

1. A display device comprising:
    a display unit configured to display an image for a right eye at a first position on a screen and an image for a left eye at a second position on a screen,
    wherein
    a binocular parallax is in a range from 2 arc sec to 3 arc min,
    resolution of the display unit is P pixels or more per inch,
    a distance between the first position and the second position is between one pixel and 0.021×P pixels,
    P is 300,
    the display unit comprises sub-pixels of red, green, and blue, two adjacent pixels in a first horizontal line are composed of six sub-pixels aligned in order of red, green, blue, blue, green, and red, and two adjacent pixels in a second horizontal line adjacent to the first horizontal line are composed of six sub-pixels aligned in order of red, red, green, blue, blue, and green.

2. The display device of claim 1, further comprising:

a memory configured to store the image for the right eye and the image for the left eye; and a controller configured to cause the image for the right eye and the image for the left eye to be read from the memory and to be displayed at the first position and the second position on the screen.

3. The display device of claim 1, further comprising:

an optical element configured to control propagation of light emitted from the display unit to make the image for the right eye incident on an observer's right eye and to make the image for the left eye incident on an observer's left eye.

4. The display device of claim 3, wherein the optical element comprises a lenticular lens, a parallax barrier, or a prism.

5. The display device of claim 1, wherein a pixel of the display unit comprises sub-pixels of different colors, the display device further comprises:

a prism arranged for the sub-pixels and configured to control a direction of light emitted from each of the sub-pixels to make the image for the right eye incident on an observer's right eye and to make the image for the left eye incident on an observer's left eye, wherein a shape of the prism is different for the sub pixels of different colors.

6. The display device of claim 5, wherein the prism is formed of a material different in refractive index in accordance with a wavelength of light, and the shape of the prism corresponds to the refractive index to light emitted from the sub-pixels.

7. A display device comprising:

a display unit configured to display an image for a right eye at a first position on a screen and an image for a left eye at a second position on a screen; and a prism, wherein a binocular parallax is in a range from 2 arc sec to 3 arc min, resolution of the display unit is P pixels or more per inch, a pixel of the display unit comprises sub-pixels of different colors, a distance between the first position and the second position is between one pixel and 0.021×pixels, P is 300, the display unit comprises sub-pixels of red, green, and blue, two adjacent pixels in a first horizontal line are composed of six sub-pixels aligned in order of red, green, blue, blue, green, and red, and two adjacent pixels in a second horizontal line adjacent to the first horizontal line are composed of six sub-pixels aligned in order of red, red, green, blue, blue, and green.

8. The display device of claim 7, further comprising:

a memory configured to store the image for the right eye and the image for the left eye; and a controller configured to cause the image for the right eye and the image for the left eye to be read from the memory and to be displayed at the first position and the second position on the screen.

9. The display device of claim 7, further comprising:

an optical element configured to control propagation of light emitted from the display unit to make the image for the right eye incident on an observer's right eye and to make the image for the left eye incident on an observer's left eye.

10. The display device of claim 9, wherein the optical element comprises a lenticular lens, a parallax barrier, or a prism.

11. A display device comprising:

a display unit configured to display an image for a right eye at a first position on a screen and an image for a left eye at a second position on a screen, wherein a binocular parallax is in a range from 2 arc sec to 3 arc min, resolution of the display unit is P pixels or more per inch, a distance between the first position and the second position is between one pixel and 0.021×P pixels, P is 300, a pixel of the display unit comprises sub-pixels of different colors, and the display device further comprises:

a prism arranged for the sub-pixels and configured to control a direction of light emitted from each of the sub-pixels to make the image for the right eye incident on an observer's right eye and to make the image for the left eye incident on an observer's left eye, wherein a shape of the prism is different for the sub pixels of different colors.

* * * * *